(12) United States Patent
Harrison et al.

(10) Patent No.: US 12,493,620 B1
(45) Date of Patent: Dec. 9, 2025

(54) HYBRID CLIENT AND SERVER RANKING SYSTEM

(71) Applicant: Snap Inc., Santa Monica, CA (US)

(72) Inventors: Shaun Harrison, Oakdale, CA (US); Daniel Vincent Grippi, New York, NY (US); Jason Yeung, New York, NY (US); David Phillip Taitz, Los Angeles, CA (US); Xingnan Xia, Bellevue, CA (US); Senthil Sundaram, Los Altos, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/821,860

(22) Filed: Aug. 30, 2024

(51) Int. Cl.
*G06F 16/2457* (2019.01)
*G06F 16/248* (2019.01)

(52) U.S. Cl.
CPC ...... *G06F 16/24578* (2019.01); *G06F 16/248* (2019.01)

(58) Field of Classification Search
None
See application file for complete search history.

(56) References Cited

U.S. PATENT DOCUMENTS

| | | | | |
|---|---|---|---|---|
| 11,188,376 B1* | 11/2021 | Alexander | ........... | G06F 9/45558 |
| 11,379,227 B2* | 7/2022 | Rao | ............. | G06F 16/2453 |
| 12,149,489 B2* | 11/2024 | Golobokov | ............. | H04L 51/10 |
| 12,159,155 B1* | 12/2024 | Alexander | ........... | G06F 9/45558 |
| 12,169,794 B1* | 12/2024 | Goodwin | ........... | G06F 16/24578 |
| 12,224,043 B2* | 2/2025 | Yu | ............. | G16B 5/20 |
| 12,249,320 B2* | 3/2025 | Hiroya | ............. | G10L 25/60 |
| 12,307,203 B2* | 5/2025 | Goslin | ............. | G06F 40/279 |
| 2019/0155915 A1* | 5/2019 | Huang | ............. | G06F 16/9535 |
| 2019/0155916 A1* | 5/2019 | Huang | ............. | G06F 16/9535 |
| 2020/0192904 A1* | 6/2020 | Safronov | ........... | G06F 16/24539 |
| 2021/0081498 A1* | 3/2021 | Goslin | ............. | G06F 18/285 |
| 2021/0182734 A1* | 6/2021 | Yano | ............. | G06N 20/00 |
| 2022/0107802 A1* | 4/2022 | Rao | ............. | G06F 16/907 |
| 2023/0229785 A1* | 7/2023 | Jurado | ............. | G06F 3/0483 726/25 |

(Continued)

OTHER PUBLICATIONS

Learning to rank with (a lot of) word features (Year: 2010).*
Toward a progress indicator for database queries (Year: 2004).*

*Primary Examiner* — Kim T Nguyen
(74) *Attorney, Agent, or Firm* — Schwegman Lundberg & Woessner, P.A.

(57) ABSTRACT

A hybrid client and server ranking system downloads and update from the backend system to a temporary storage location on the computing device and validates the update to the model without loading it permanently into the application by executing the update to the model with no data to generate an evaluation score and determining that validation passed or failed based on the evaluation score. Based on determining that validation passed, the hybrid client and server ranking system generates an updated model by updating the model with the update to the model. The hybrid client and server ranking system can further generate composite features comprising new features and local features currently stored on the computing device. The hybrid client and server ranking system generates, using the updated model and the composite features, a ranked list of content. The ranked list of content can be displayed on a computing device.

20 Claims, 8 Drawing Sheets

(56) References Cited

U.S. PATENT DOCUMENTS

| | | | |
|---|---|---|---|
| 2023/0367992 A1* | 11/2023 | Chakravarthy | G06F 18/2413 |
| 2024/0005927 A1* | 1/2024 | Goscha | G10L 15/32 |
| 2024/0296535 A1* | 9/2024 | Bakunov | G06T 7/0002 |
| 2024/0314091 A1* | 9/2024 | Golobokov | G06N 20/00 |
| 2024/0370415 A1* | 11/2024 | Yao | G06F 16/256 |
| 2024/0397128 A1* | 11/2024 | Kammachi Sreedhar | H04N 21/84 |
| 2025/0016337 A1* | 1/2025 | Kammachi | H04N 19/30 |
| 2025/0021464 A1* | 1/2025 | Lang | G06F 11/3612 |
| 2025/0055818 A1* | 2/2025 | Golobokov | H04L 51/10 |
| 2025/0077487 A1* | 3/2025 | Groenewegen | G06F 16/215 |
| 2025/0086239 A1* | 3/2025 | Gupta | G06F 16/9535 |
| 2025/0094316 A1* | 3/2025 | Liu | G06N 3/08 |
| 2025/0103853 A1* | 3/2025 | Schultz | G06F 16/2379 |
| 2025/0104451 A1* | 3/2025 | Ravishankar | G06N 5/04 |
| 2025/0131003 A1* | 4/2025 | Xu | G06F 16/248 |
| 2025/0147753 A1* | 5/2025 | Gul | G06N 5/04 |
| 2025/0156427 A1* | 5/2025 | Mohseni Taheri | G06F 16/2455 |
| 2025/0190763 A1* | 6/2025 | Banuelos | G06N 3/0455 |
| 2025/0217418 A1* | 7/2025 | Bathwal | G06F 16/24575 |

* cited by examiner

HYBRID CLIENT AND SERVER RANKING SYSTEM

BACKGROUND

A content sharing platform receives millions of messages from users desiring to share media content such as audio, images, and video between user devices, such as mobile and other computing devices. These messages or media content can be shared individually between user devices or can be included in media collections to be shared between user devices.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
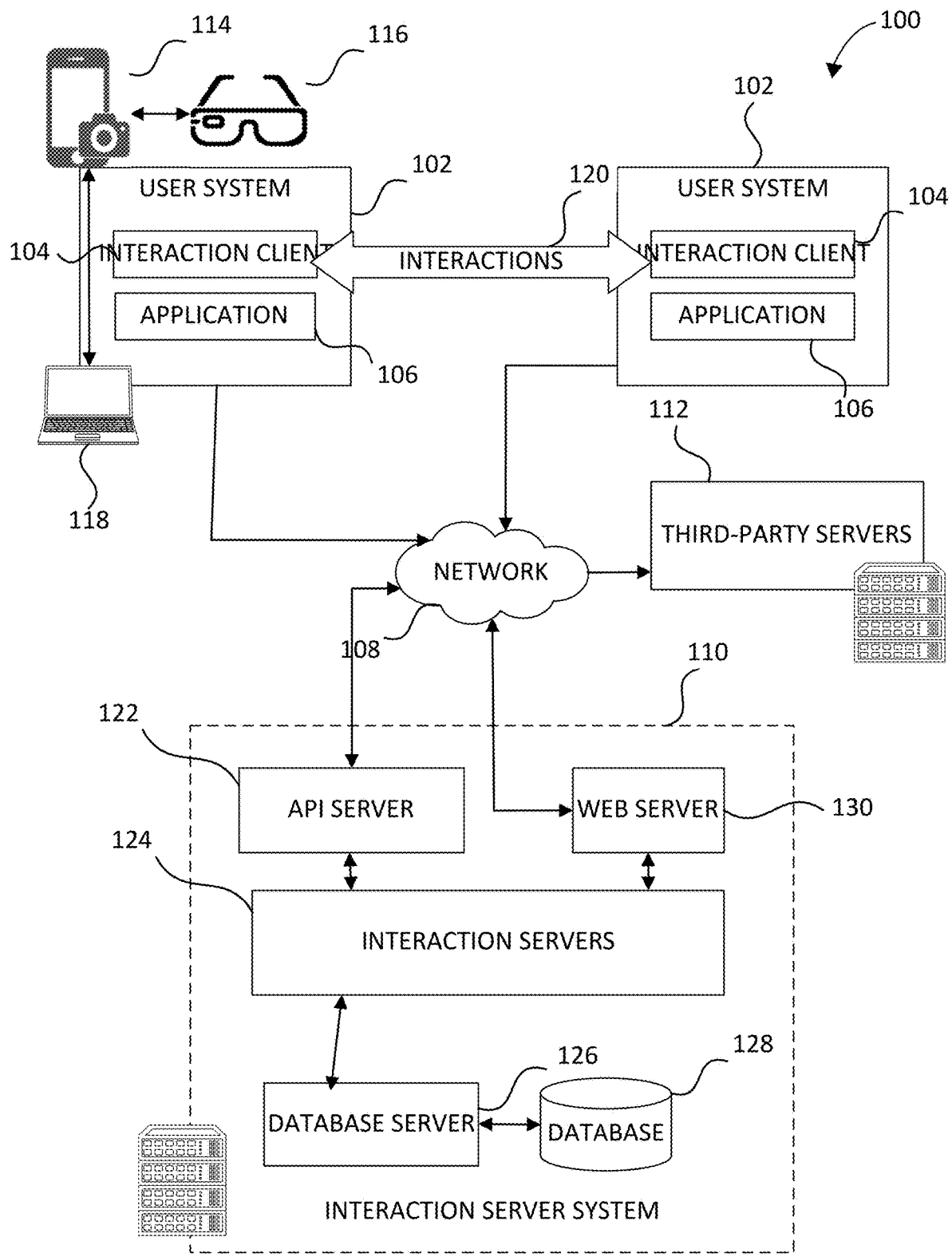
FIG. 1 is a diagrammatic representation of a networked environment in which the present disclosure may be deployed, according to some examples.

A ranking system is typically provided via hard coded logic on a computing device (client), which leads to slow iteration of the ranking logic through client release and convoluted branching for feature gates that can make it difficult to evaluate. Since logic exists on the client, the typical ranking system is limited to only evaluating data that is available on the client, which makes it difficult to add new data points to evaluate. Adding new data points in a typical ranking system involves building out new client APIs for fetching and storing, and also requires all of those data points to be safe to expose to an end user of the computing device.

One solution is to shift all ranking functionality to a backend server, however, functionality, such as providing a ranked list of contacts to which to send an image or video, needs to be immediately available and reactive to local changes, even without an internet connection. Further, privacy of user data is important and thus, keeping user data locally on the device is desired.

A hybrid client and server ranking system is described herein that provides remote and local features that are combined to execute a remotely provided model on a computing device. The hybrid client and server ranking system provides the ability to rapidly iterate a ranking model and incorporate more nuanced data that is not available on a client, and in some cases, is not safe to make available to a client. The hybrid client and server ranking system blends both server and client data and logic to address at least the technical challenges mentioned above. For example, the hybrid client and server ranking system maintains the ability to near-instantaneously rank content regardless of internet availability and function even when data is missing on the client. The server provides logic to rank content and additional data to inform the ranking. The hybrid client and server ranking system accommodates a variety of models including logic-based models and machine learning based models. Moreover, the hybrid client and server ranking system comprises design components that are adaptable for use cases beyond ranking of content. Further, the ranking functionality will always work, regardless if something goes wrong during the ranking process.

The hybrid client and server ranking system provides for feedback in real time for any updates made and to roll back or provide further updates without having to wait for a client release cycle for an application update or for an end user to install an application update. In this way, the hybrid client and server ranking system further provides a higher quality and more efficient system for updating an algorithm based on real time feedback. Moreover, user data stays local to the user's computing device, further enhancing privacy of user data.

In some examples, the hybrid client and server ranking system determines that an update to a model for an application running on the computing device is available on a backend system. The model is configured to analyze content to generate a ranked list of content. The hybrid client and server ranking system downloads the update from the backend system to a temporary storage location on the computing device. The hybrid client and server ranking system validates the update to the model without loading it permanently into the application by executing the update to the model with no data to generate an evaluation score and to determine that validation passed or failed based on the evaluation score. Based on determining that validation passed, the hybrid client and server ranking system generates an updated model by updating the model with the update to the model. In some examples, the hybrid client and server ranking system further determines that new features for the model are available on the backend system and generates composite features comprising the new features and local features currently stored on the computing device. The hybrid client and server ranking system stores the composite features to a data store corresponding to the and generates, using the updated model and the composite features, a ranked list of content. The ranked list of content can be displayed on a computing device.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 can include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

System Architecture

Figure 2:
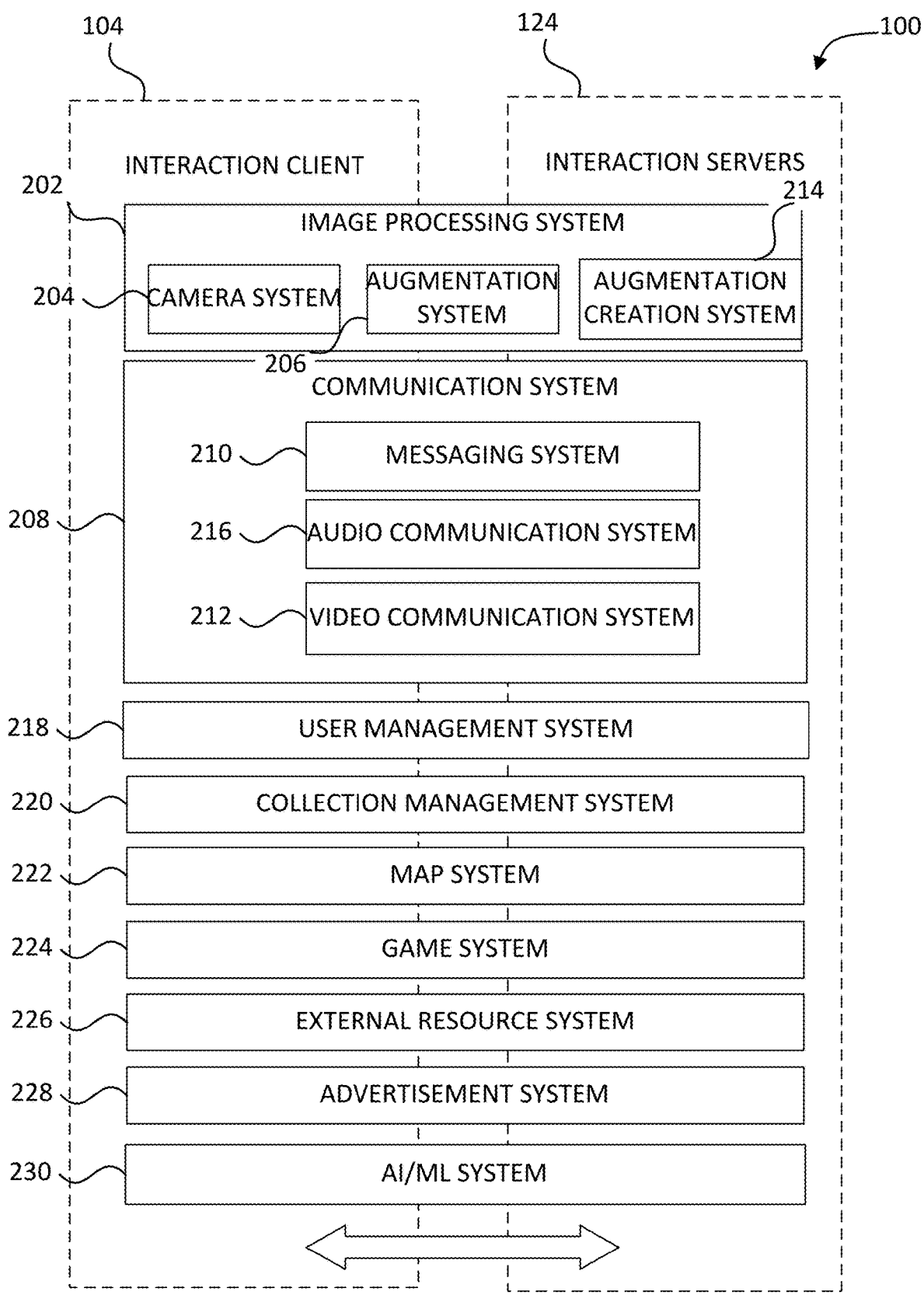
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a micro service application) may have components that enable it to operate independently and communicate with other services. Example components of microservice subsystem may include:

- Function logic: The function logic implements the functionality of the microservice subsystem, representing a specific capability or function that the microservice provides.
- API interface: Microservices may communicate with each other through well-defined APIs or interfaces, using lightweight protocols such as REST or messaging. The API interface defines the inputs and outputs of the microservice subsystem and how it interacts with other microservice subsystems of the interaction system 100.
- Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.
- Service discovery: Microservice subsystems may find and communicate with other microservice subsystems of the interaction system 100. Service discovery mechanisms enable microservice subsystems to locate and communicate with other microservice subsystems in a scalable and efficient way.
- Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

The augmentation system 206 provides functions related to the generation and publishing of augmentations (e.g., AR options such as media overlays) for images captured in real-time by cameras of the user system 102 or retrieved from memory of the user system 102 of FIG. 1. For example, the augmentation system 206 operatively selects, presents, and displays media overlays (e.g., an image filter or an image lens) to the interaction client 104 for the augmentation of real-time images received via the camera system 204 or stored images retrieved from memory 702 of a user system 102. These augmentations are selected by the augmentation system 206 and presented to a user of an interaction client 104, based on a number of inputs and data, such as for example:

Geolocation of the user system 102;
Entity relationship information of the user of the user system 102; and
Selection of an AR option.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, examples such as custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a graphical user interface (GUI) of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource.

In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands.

Data Architecture

Figure 3:
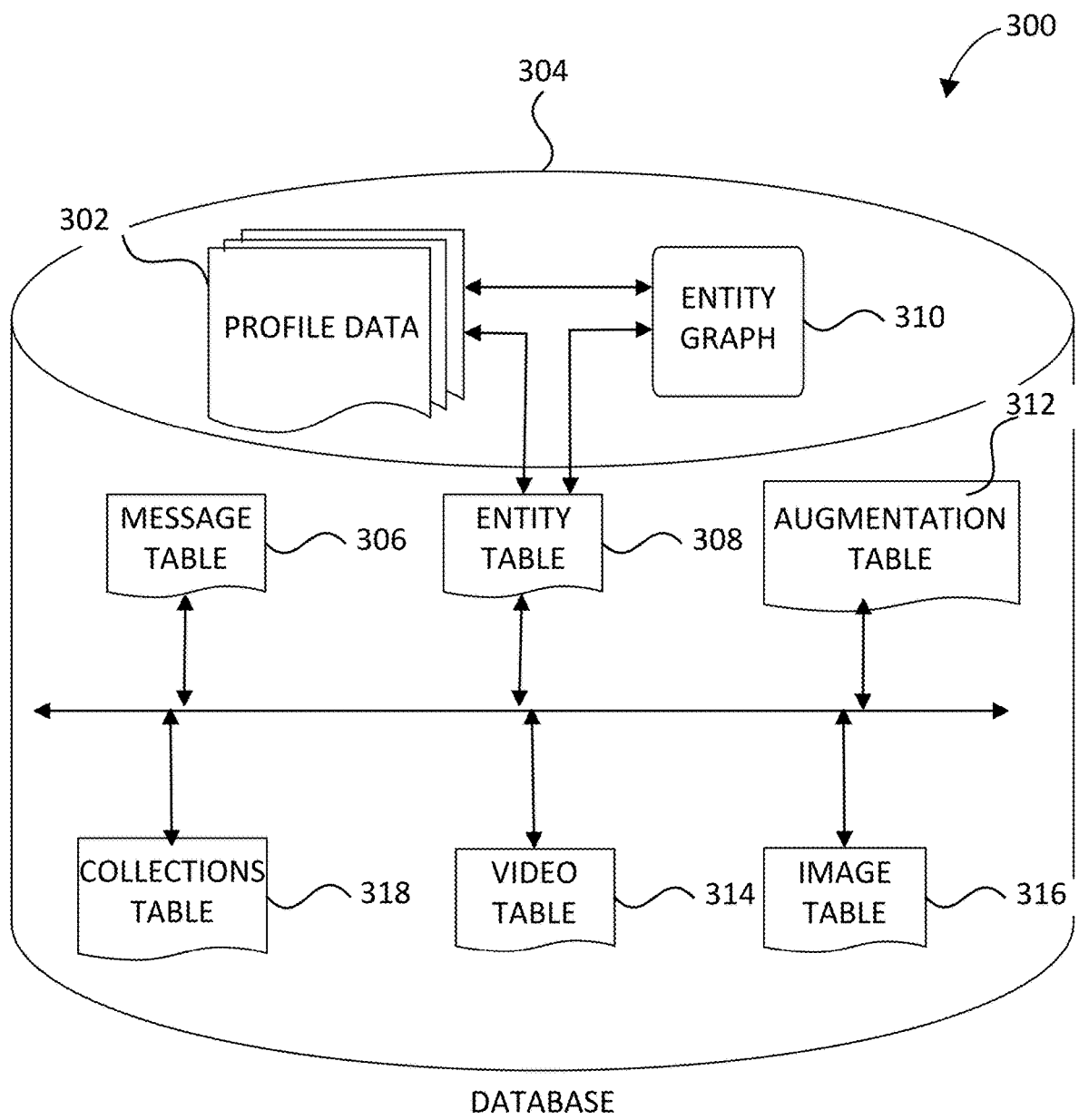
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100 or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Data Communications Architecture

Figure 4:
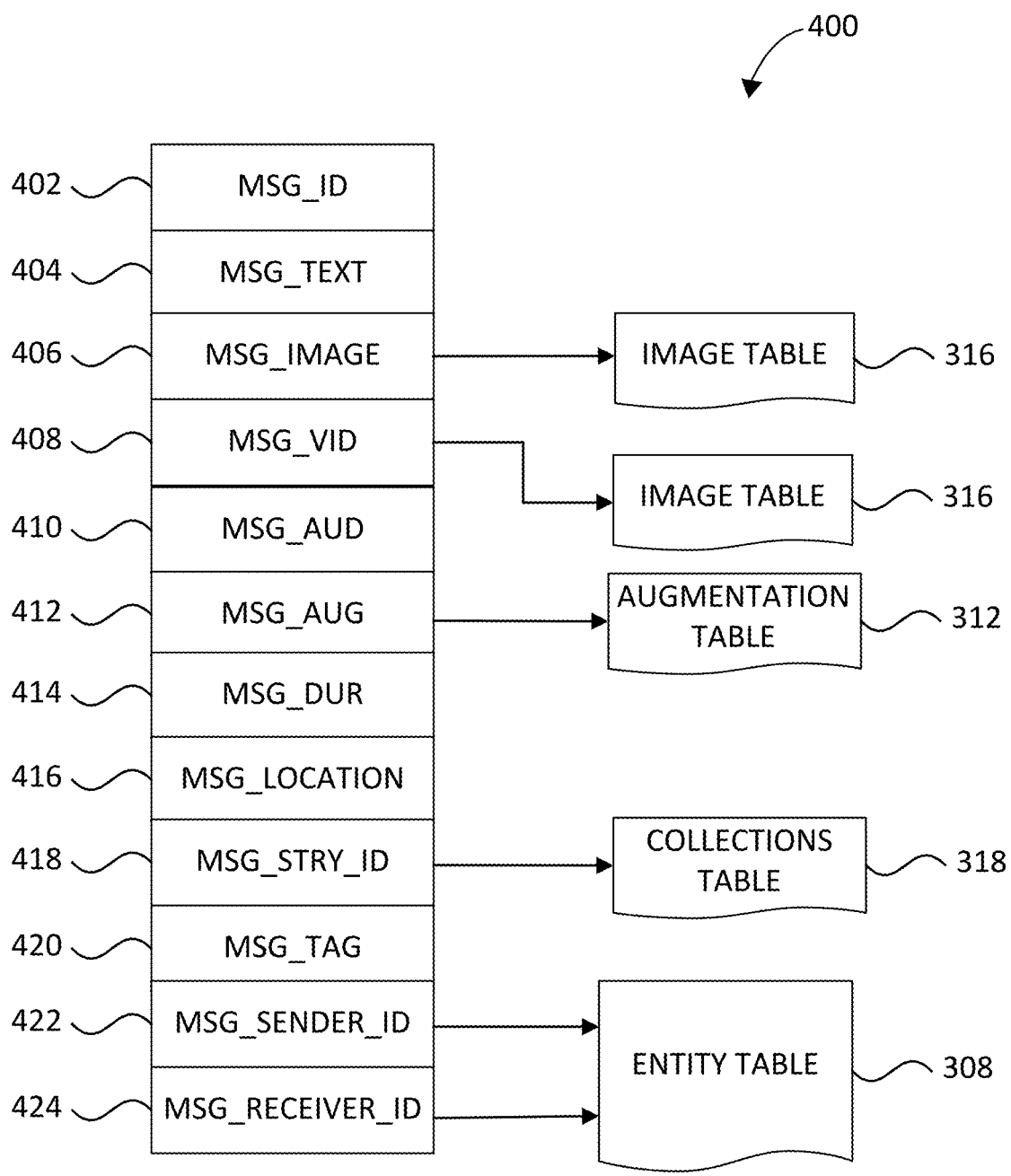
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

- Message identifier 402: a unique identifier that identifies the message 400.
- Message text payload 404: text, to be generated by a user via a user interface of the user system 102, and that is included in the message 400.
- Message image payload 406: image data, captured by a camera component of a user system 102 or retrieved from a memory component of a user system 102, and that is included in the message 400. Image data for a sent or received message 400 may be stored in the image table 316.
- Message video payload 408: video data, captured by a camera component or retrieved from a memory component of the user system 102, and that is included in the message 400. Video data for a sent or received message 400 may be stored in the image table 316.
- Message audio payload 410: audio data, captured by a microphone or retrieved from a memory component of the user system 102, and that is included in the message 400.
- Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.
- Message duration parameter 414: parameter value indicating, in seconds, the amount of time for which content of the message (e.g., the message image payload 406, message video payload 408, message audio payload 410) is to be presented or made accessible to a user via the interaction client 104.
- Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- Message story identifier 418: identifier values identifying one or more content collections (e.g., "stories" identified in the collections table 318) with which a particular content item in the message image payload 406 of the message 400 is associated. For example, multiple images within the message image payload 406 may each be associated with multiple content collections using identifier values.
- Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- Message sender identifier 422: an identifier (e.g., a messaging system identifier, email address, or device identifier) indicative of a user of the user system 102 on which the message 400 was generated and from which the message 400 was sent.
- Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316.

Similarly, values within the message video payload 408 may point to data stored within an image table 316, values stored within the message augmentation data 412 may point to data stored in an augmentation table 312, values stored within the message story identifier 418 may point to data stored in a collections table 318, and values stored within the message sender identifier 422 and the message receiver identifier 424 may point to user records stored within an entity table 308.

Hybrid Client and Server Ranking System

Figure 5:
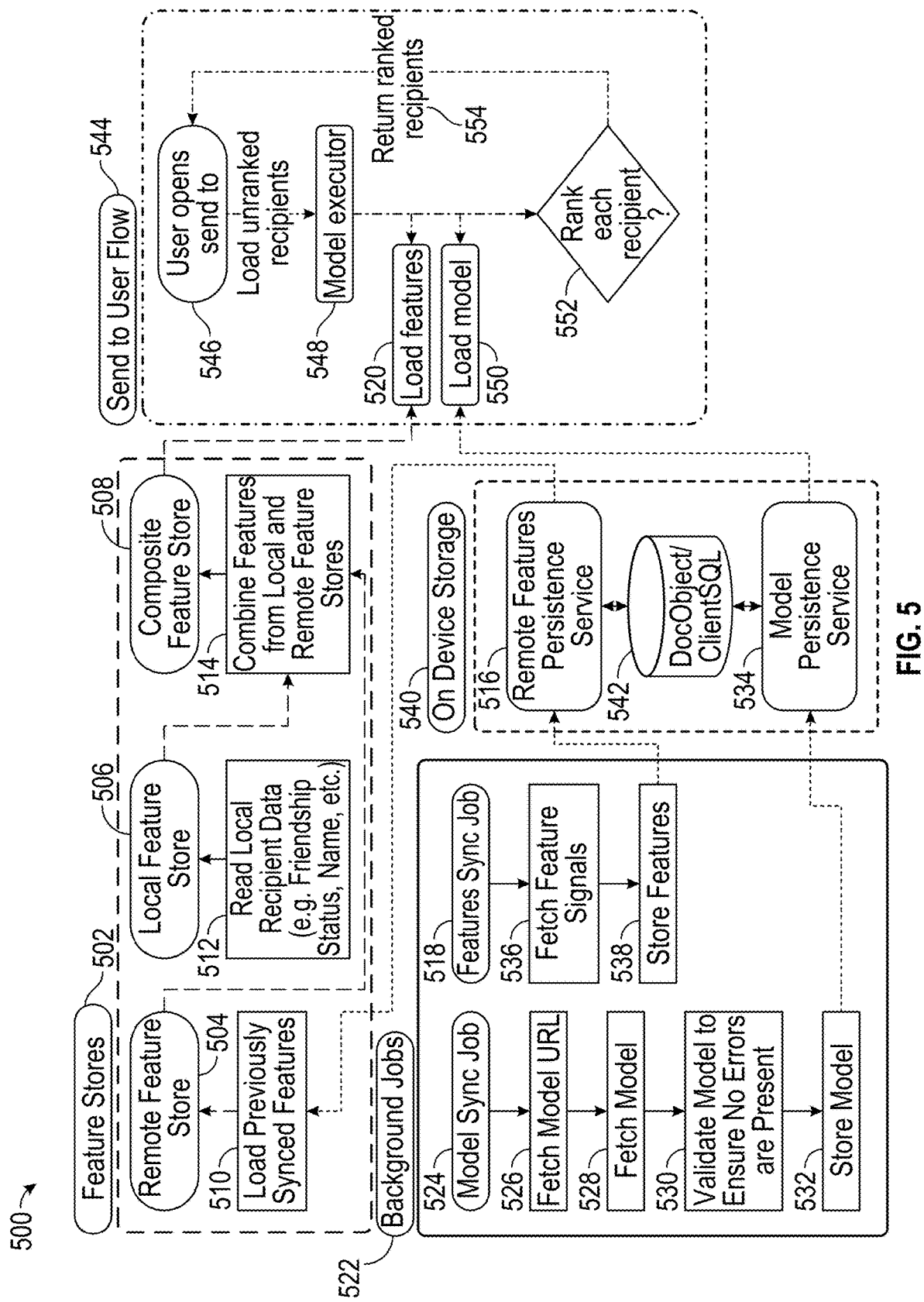
FIG. 5 is a block diagram illustrating an example hybrid client and server ranking system, according to some examples.

FIG. 5 is a block diagram illustrating an example hybrid client and server ranking system 500. Components of the hybrid client and server ranking system 500 can be part of the user system 102, also referred to herein as a computing device, and/or interaction server system 110.

In some examples, the example hybrid client and server ranking system 500 is a system included in an application installed and running on a computing device, such as user system 102. The example hybrid client and server ranking system 500 includes features stores 502. A feature store is an interface that provides features for a list of content (e.g., subjects). For example, a feature store provides an interface to retrieve a map of features from each subject (e.g., image, video, recipient, media collection) being evaluated. The feature stores 502 comprise a remote feature store 504, a local feature store 506 and a composite feature store 508.

In some examples, the hybrid client and server ranking system 500 loads previous synced features 510 from a remote features persistence service 516, which are received from a features sync job 518, described below. The remote feature store 504 makes server provided features available to the model executor 548. In some examples, the remote feature store does not directly fetch features from the back-end server, but rather loads values previously downloaded by the features sync job 518. In some examples this is backed up by the remote features persistence service 516. Some example features include a selection probability or an interaction probability.

In some examples, the hybrid client and server ranking system 500 reads local recipient data 512, such as friendship status and name. The local feature store 506 compiles data that is available locally on the client. In some examples, this includes information such as friendship status, interaction time, streak information, and more. In some examples, different recipients have different data available to them for a variety of reasons, ranging from the type of recipient (e.g., friend versus group) to the user's interactions with the recipient. Example models here do not assume that all data is available for all recipients, and instead account for values being missing.

The hybrid client and server ranking system 500 combines the features from the local and remote feature stores 514 to generate composite features stored in the composite feature store 508. The composite features store 508 combines any number of feature store implementations into a single dataset, in some examples. This is the primary data store that is exposed to the model executor 548 and keeps a clear separation by not requiring the model executor 548 to understand the differences in where data may be coming from. The composite features from the composite feature store 508 are loaded 520 into the application.

The example hybrid client and server ranking system 500 further includes background jobs 522. To ensure the hybrid client and server ranking system 500 is fast and always available, models and data are synced in background jobs, in some examples. In some examples, the background jobs 522 comprise a model sync job 524 and a features sync job 518.

The model sync job 524 is responsible for fetching the model. The model sync job 524 reads a version from the model, compares it to a previously downloaded model version and if the model has not changed, the job ends early. If the model has changed, the model sync job 524 fetches a model URL 526, fetches the model 528, validates the model to ensure no errors are present 530 and, if no errors are present, stores the model 532 in one or more databases 542 via the model persistence service 534. The model sync job 524 performs a validation test to validate that the model is executable before replacing the previously downloaded model. The validation test is performed by executing the model with no features to determine if it generates an error or successfully returns a score (e.g., 0). Real time metrics are used to track the success rate of model syncing and to provide alerts in the event of an issue.

In one example, the model is executed in a try/catch block for validation. This allows the hybrid client and server ranking system 500 to prevent runtime crashes caused by the model and gracefully fallback to a previously downloaded model or hardcoded ranking system in the event of failure. In some examples, execution failures are logged in real time. In this way the hybrid client and server ranking system 500 provides immediate feedback on failures.

The model can be one of a variety of models, such as a protobuf-based AST model, a machine learning based model, or a composer or JavaScript based model. The model comprises logic to evaluate a set of subjects. As in the examples of send to functionality, the model provides the logic to score an individual recipient to provide in a list of recipients to whom to send a message.

The features sync job 518 fetches feature signals 536 (e.g., feature for a user's friends and groups) and stores the features 538 in the one or more databases 542 via the remote features persistence service 516. The on-device storage 540 comprises the remote feature persistence service 516, one or more databases 542 and the model persistence service 534.

The example hybrid client and server ranking system 500 includes a send to user flow 544. It is to be understood that the "send to" functionality is one example of a user flow that can utilize the model, features and method described herein. Other functionality, such as ranking of other content, such as images, videos and media collections, can be used in the example hybrid client and server ranking system 500. In the send to user flow 544, the example hybrid client and server ranking system 500 detects a user selecting an option to share content with other users, such as by selecting or opening a send to option 546.

The example hybrid client and server ranking system 500 loads unranked recipients into the model executor 548. The model executor 548, is configured to execute a model to rank a list of content. For example, the model executor 548 takes in an unranked list of content, such as recipients, and produces a ranked list of subjects. In some examples, the model executor 548 produces a ranked list based on scoring each recipient or other content. The model executor 548 loads features 520 and loads the model 550 and uses the model 550 and features 520 to rank each recipient 552. The model executor 548 returns ranked recipients 554. All the ranked recipients, or a subset of the ranked recipients, can be displayed on a display of the computing device.

For example, the model executor 548 is called with a list of content (subjects) to be ranked. In the case of send to functionality, each time a send to session begins, such as when an image or video is captured, the model executor 548 is called with a list of available recipients (content/subjects). The model executor 548 will then load the previously downloaded remote model and concurrently compiles a list of features from the feature stores 502. Once both the models and features are ready, the model executor 548 will iterate through each subject (e.g., recipient) and execute the model to determine the output. For example, the model executor 548 will evaluate each recipient against a scoring model, and once all recipients have been scored, the model executor 548 sorts them by their score. Further details of how the hybrid client and server ranking system 500 performs various operations are described below with respect to FIG. 6.

Figure 6:
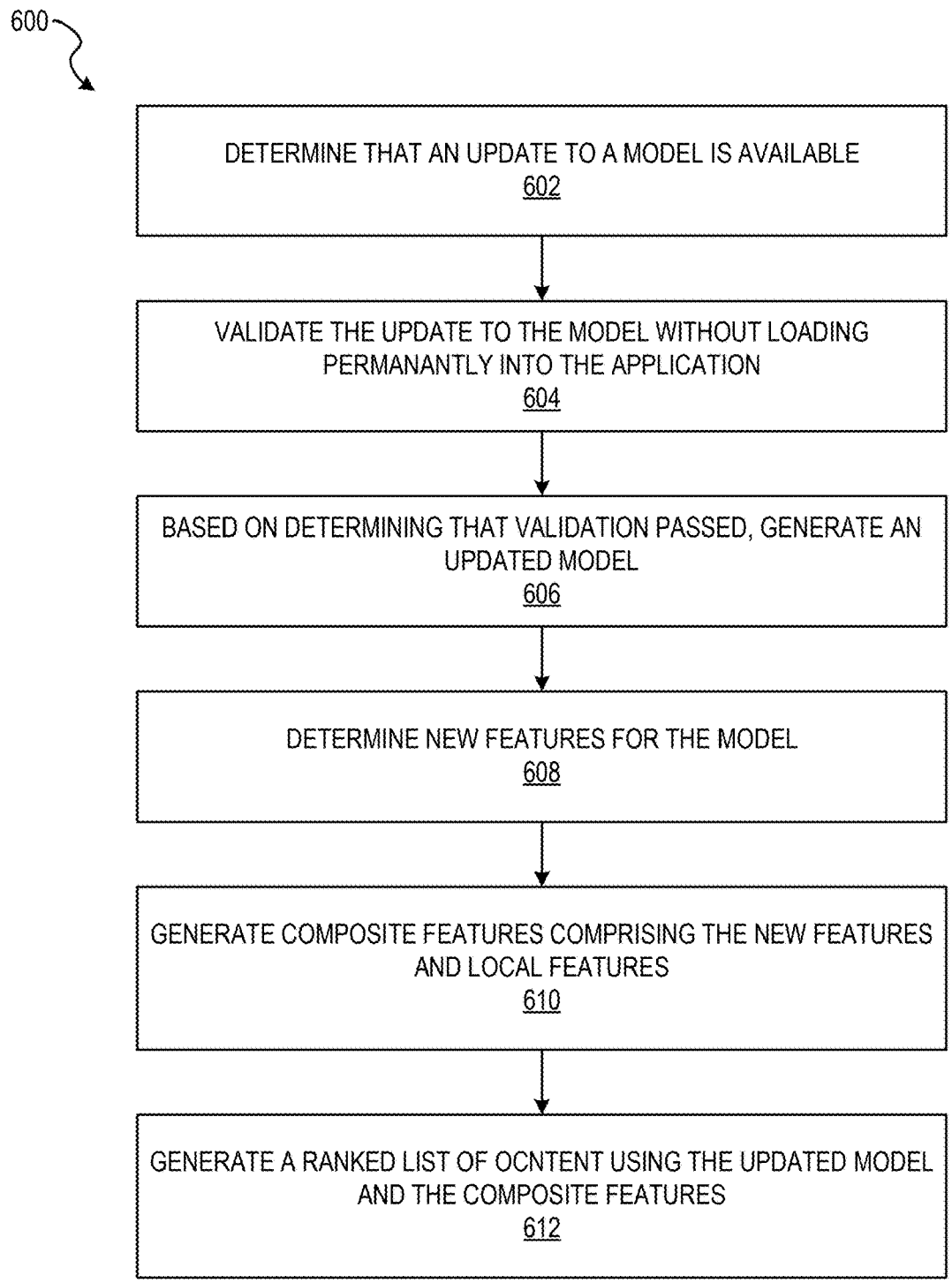
FIG. 6 is a flow chart illustrating aspects of a method, according to some examples.

FIG. 6 is a flow chart illustrating aspects of a method 600 for operation of a hybrid client and server ranking system, according to some example embodiments. For illustrative purposes, the method 600 is described with respect to the interaction system 100 of FIG. 1 and the hybrid client and server ranking system 500 of FIG. 5. It is to be understood that the method 600 may be practiced with other system configurations in other embodiments.

In operation 602, a computing device (e.g., user system 102) determines that an update to a model is available. For example, the computing device checks if a new version of a model is available when the application is first opened and/or periodically when the application is running. In some examples, the computing device determines that an update to a model for an application running on the computing device is available on a backend system. In some examples, the model is configured to analyze content to generate a ranked list of content.

In some examples, the model is an AST model, a machine learning based model, a composer or JavaScript based model, or other type of model. In some examples, the model is a protobuf-based AST model that the computing device executes using a small client-side runtime that takes in the tree, subject and features to produce a score. In examples described herein the model is generated to produce scores, but it is to be understood that any input and output can be leveraged to provide ranking and diversification of recipients or other content. In some examples the AST model is limited to more closely resemble a decision tree rather than a full-blown AST model written in JavaScript. This allows the hybrid client and server ranking system to tune for performance to implement on just what is needed and to not include functionality such as loops that can cause real runtime problems, such as looping indefinitely.

In some examples, the computing device determines that an update to the model is available by comparing a version of the update to the model to a version of a previously downloaded version of the model on the application. In some examples, the update to the model comprises a series of characters that is interpreted by the application to update the model and the update to the model is not executable by itself. In some examples, the series of characters is in a Protocol Buffers (Protobuf) format. Since the update to the model is not an executable file, the update provides for a safe way to update a model without introducing any way for malware or other malicious code to be inserted into the application or on the computing device.

Based on the computing system determining that an update to the model is available, the computing device downloads the update from the backend system to a temporary storage location in memory on the computing device to allow for validation of the update to the model without affecting the computing device or application. In some examples the computing device uses a try/catch block, or similar technique, to validate the update to the model without loading it permanently into the application.

For example, in operation 604, the computing device validates the model without loading it permanently into the application by executing the update to the model with no data or corrupt data (e.g., intentionally bad data) to generate an evaluation score and then determines that validation passed or failed based on the evaluation score. In this way, the computing device can confirm that the update still executes regardless of what data comes in. If the computing device determines that validation failed, the computing device removes the update to the model from the computing device without generating an updated model. Based on determining that validation passed, the computing device generates an updated model by updating the model with the update to the model, in operation 606.

As described above, the computing device also checks for any new or updated features for the model. For example, the computing device checks if a new or updated features are available when the application is first opened and/or periodically when the application is running. In operation 608, the computing device determines that new features for the model are available on the backend system. In operation 610, the computing device generates composite features comprising the new features and local features currently stored on the computing device. As explained previously, local features comprise at least one of a friendship status, account name or streak information and remote features (new features) are generated remotely. In some examples, new features comprise an input value associated with a subject to be evaluated during ranking. In some examples the input value comprises a frequency of sending or a frequency of viewing. The computing device stores the composite features to the data store corresponding to the application.

In operation 612, the computing device generates a ranked list of content, using the updated model and the composite features. For example, the composite features and unranked content are input into the updated model and the updated model outputs scores and/or a ranked list of the content. In some examples, one or more other models are used in the ranking process to determine the final ranked list. The ranked list of content can then be displayed on a display of the computing device, such as in a user interface of the application running on the computing device.

In some examples, the ranked list is a ranked list of contacts to which a user can send a message including an image or video. For example, the computing device captures an image or video via a camera of the computing device. The computing device displays, via a user interface of the application running on the computing device, an option to share (e.g., "send to") the captured image or video with another user or system. The computing device detects selection of the option to share the captured image or video and evaluates each contact in a list of contacts accessible by the application, using the updated model and composite features as explained above, to generate a score for each contact in the list of contacts accessible by the application. The computing device ranks the list of contacts by the score for each contact to generate the ranked list. The ranked list, or a subset of the ranked list (e.g., a predefined number of top ranked contacts or a number of contacts that fits within the user interface based on a size of a display of the computing device) is displayed for selection to share the image or video.

In some examples, the ranked list is a ranked list of media content items (e.g., images or video) or a ranked list of media collections. For example, the computing device evaluates each media collection in a plurality of media collections available to be viewed in the application. In some examples, each media collection comprises a plurality of images or videos. The computing device generates a score for each media collection in the plurality of media collections, using the updated model and composite features as explained above, and generates the ranked list based on the score for each media collection. The computing device causes display of the ranked list of media collections to view in the application.

As mentioned above, in some examples, the computing device generates metrics associated with use of the updated model. Some example metrics include a session time, a send count, a crash rate, CPU metrics, and battery metrics. These metrics can provide insight to a success rate of the updated model. For example, if the computing device detects regressions in a session time for a functionality such as send to, this can indicate that users need to spend more time finding people they want to send to and thus, an issue with ranking changes. Likewise, a change to send counts can indicate success or failure of model changes. A crash rate should not be impacted by an updated model since any update to a model is validated before actually generating an updated model to be used by the application. A crash rate metric, however, can still be captured in the event of an anomaly. Any regression in CPU and battery metrics indicate that the updated model is less performant that legacy systems thus requiring additional tuning. Other examples metrics include latency and a number of selected recipients.

These real time metrics allow for understanding of the impact of model changes in real time during deployments. For example, different models can be targeted to different users and tested out to see the success or failure of the different models based on analysis of the metrics. Further, these real time metrics allow for tracking the success rate of model executions, model syncing and feature syncing to evaluate in real time whether there are issues with any new model deployment. Any issues can be addressed immediately by removing the update to the model or providing a new update to the mode. This is in stark contrast to typical ranking systems (and other updates) that require significant code and developer time and waiting for a user to update the application to effect the changes. In this way, the hybrid client and server and ranking system can test and roll out new ranking models independent of client releases and across platforms. Further, the updates are platform agnostic.

Machine Architecture

Figure 7:
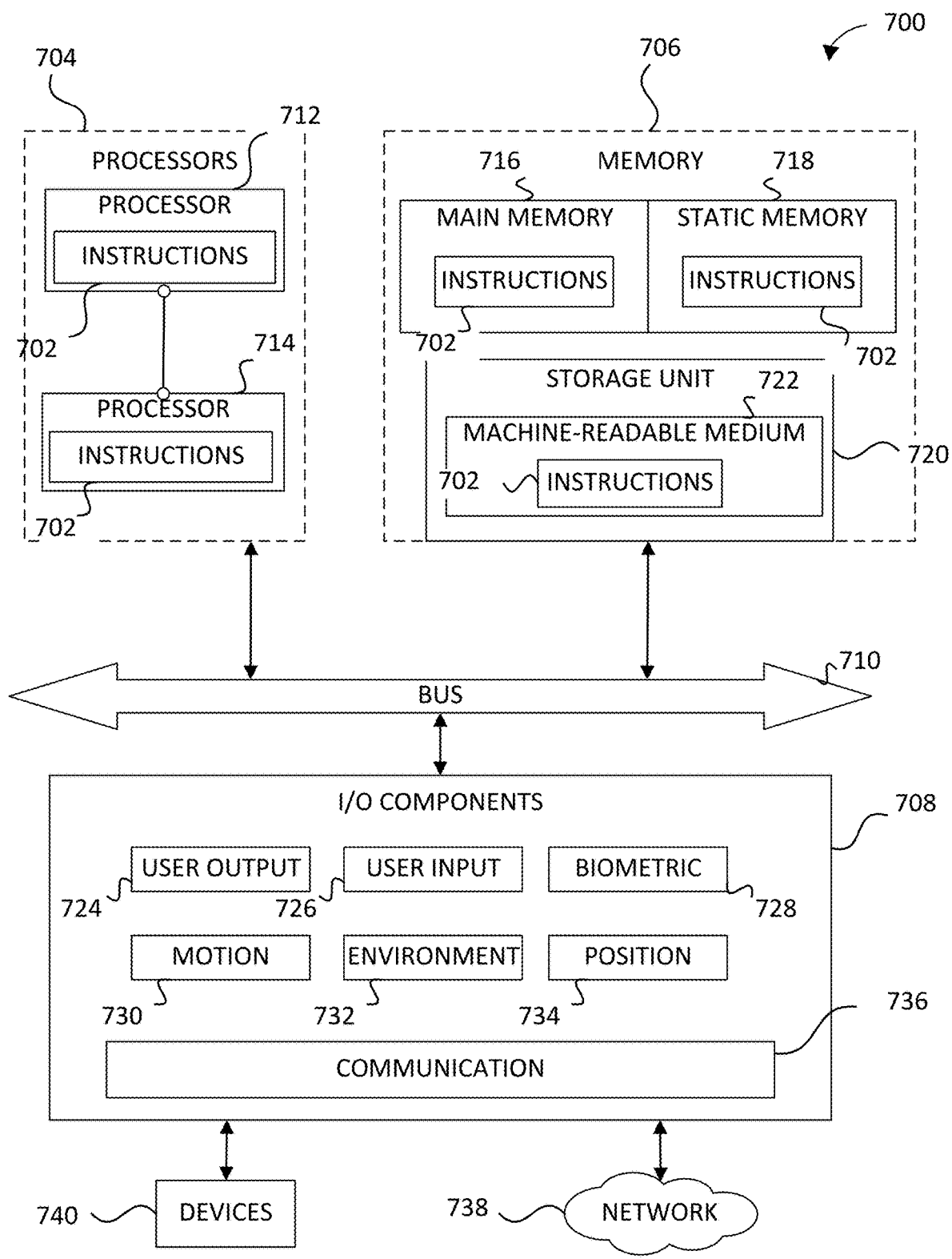
FIG. 7 is a diagrammatic representation of a machine in the form of a computer system within which a set of instructions may be executed to cause the machine to perform any one or more of the methodologies discussed herein, according to some examples.

FIG. 7 is a diagrammatic representation of the machine 700 within which instructions 702 (e.g., software, a program, an application, an applet, an app, or other executable code) for causing the machine 700 to perform any one or more of the methodologies discussed herein may be executed. For example, the instructions 702 may cause the machine 700 to execute any one or more of the methods described herein. The instructions 702 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 702, sequentially or otherwise, that specify actions to be taken by the machine 700. Further, while a single machine 700 is illustrated, the term "machine" shall also be taken to include a collection of machines that individually or jointly execute the instructions 702 to perform any one or more of the methodologies discussed herein. The machine 700, for example, may comprise the user system 72 or any one of multiple server devices forming part of the interaction server system 110. In some examples, the machine 700 may also comprise both client and server systems, with certain operations of a particular method or algorithm being performed on the server-side and with certain operations of the particular method or algorithm being performed on the client-side.

The machine 700 may include processors 704, memory 706, and input/output I/O components 708, which may be configured to communicate with each other via a bus 710. In an example, the processors 704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 712 and a processor 714 that execute the instructions 702. The term "processor" is intended to include multi-core processors that may comprise two or more independent processors (sometimes referred to as "cores") that may execute instructions contemporaneously. Although FIG. 7 shows multiple processors 704, the machine 700 may include a single processor with a single-core, a single processor with multiple cores (e.g., a multi-core processor), multiple processors with a single core, multiple processors with multiples cores, or any combination thereof.

The memory 706 includes a main memory 716, a static memory 718, and a storage unit 720, both accessible to the processors 704 via the bus 710. The main memory 706, the static memory 718, and storage unit 720 store the instructions 702 embodying any one or more of the methodologies or functions described herein. The instructions 702 may also reside, completely or partially, within the main memory 716, within the static memory 718, within machine-readable medium 722 within the storage unit 720, within at least one of the processors 704 (e.g., within the processor's cache memory), or any suitable combination thereof, during execution thereof by the machine 700.

The I/O components 708 may include a wide variety of components to receive input, provide output, produce output, transmit information, exchange information, capture measurements, and so on. The specific I/O components 708 that are included in a particular machine will depend on the type of machine. For example, portable machines such as mobile phones may include a touch input device or other such input mechanisms, while a headless server machine will likely not include such a touch input device. It will be appreciated that the I/O components 708 may include many other components that are not shown in FIG. 7. In various examples, the I/O components 708 may include user output components 724 and user input components 726. The user output components 724 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 726 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 708 may include biometric components 728, motion components 730, environmental components 732, or position components 734, among a wide array of other components. For example, the biometric components 728 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 730 include acceleration sensor components (e.g., accelerometer), gravitation sensor components, and rotation sensor components (e.g., gyroscope).

The environmental components 732 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 734 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 708 further include communication components 736 operable to couple the machine 700 to a network 738 or devices 740 via respective coupling or connections. For example, the communication components 736 may include a network interface component or another suitable device to interface with the network 738. In further examples, the communication components 736 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 740 may be another machine or any of a wide variety of peripheral devices (e.g., a peripheral device coupled via a USB).

Moreover, the communication components 736 may detect identifiers or include components operable to detect identifiers. For example, the communication components 736 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 736, such as location via Internet Protocol (IP) geolocation, location via Wi-Fi® signal triangulation, location via detecting an NFC beacon signal that may indicate a particular location, and so forth.

The various memories (e.g., main memory 716, static memory 718, and memory of the processors 704) and storage unit 720 may store one or more sets of instructions and data structures (e.g., software) embodying or used by any one or more of the methodologies or functions described herein. These instructions (e.g., the instructions 702), when executed by processors 704, cause various operations to implement the disclosed examples.

The instructions 702 may be transmitted or received over the network 738, using a transmission medium, via a network interface device (e.g., a network interface component included in the communication components 736) and using any one of several well-known transfer protocols (e.g., hypertext transfer protocol (HTTP)). Similarly, the instructions 702 may be transmitted or received using a transmission medium via a coupling (e.g., a peer-to-peer coupling) to the devices 740.

Software Architecture

Figure 8:
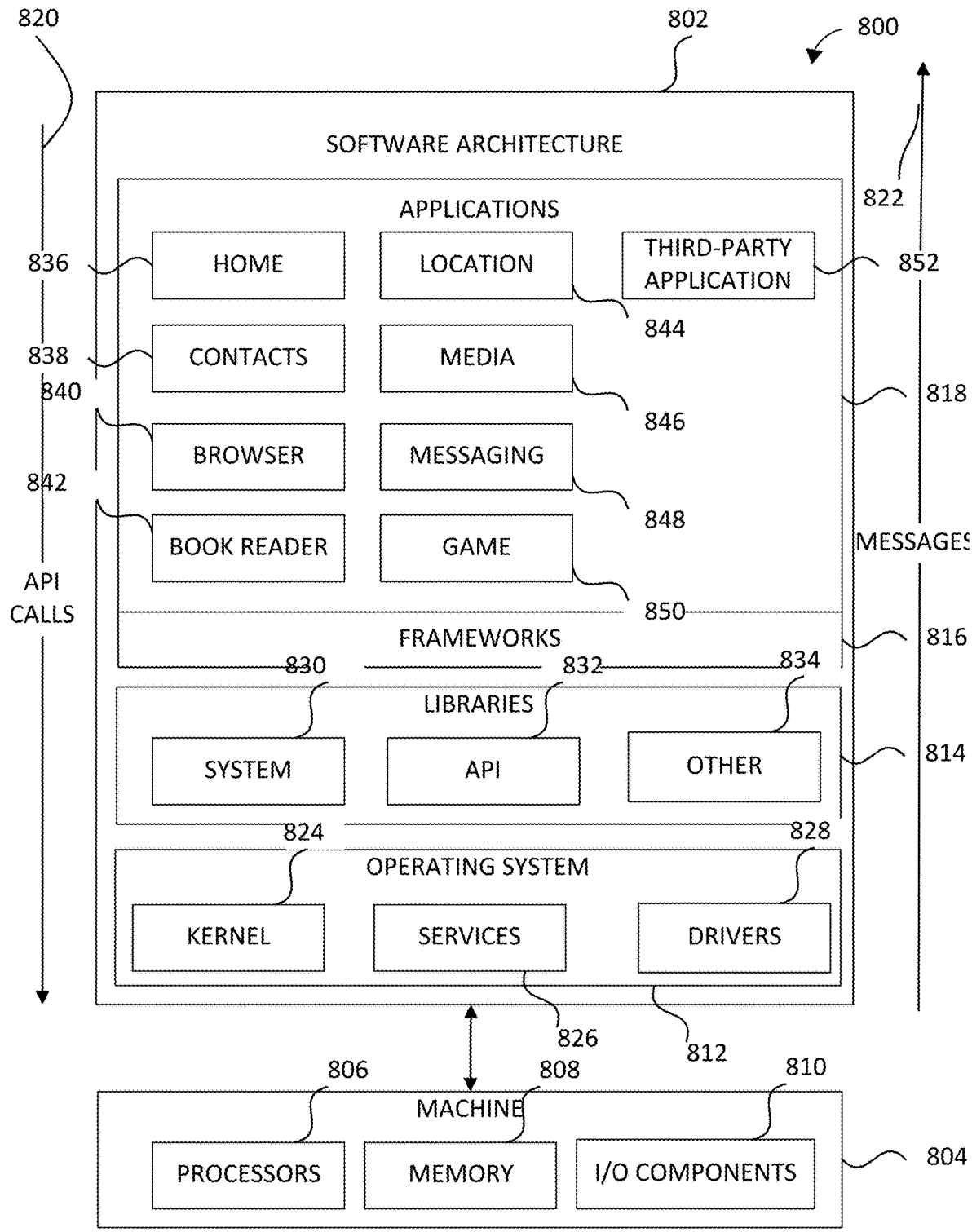
FIG. 8 is a block diagram showing a software architecture within which examples may be implemented.

FIG. 8 is a block diagram 800 illustrating a software architecture 802, which can be installed on any one or more of the devices described herein. The software architecture 802 is supported by hardware such as a machine 804 that includes processors 806, memory 808, and I/O components 810. In this example, the software architecture 802 can be conceptualized as a stack of layers, where each layer provides a particular functionality. The software architecture 802 includes layers such as an operating system 812, libraries 814, frameworks 816, and applications 818. Operationally, the applications 818 invoke API calls 820 through the software stack and receive messages 822 in response to the API calls 820.

The operating system 812 manages hardware resources and provides common services. The operating system 812 includes, for example, a kernel 824, services 826, and drivers 828. The kernel 824 acts as an abstraction layer between the hardware and the other software layers. For example, the kernel 824 provides memory management, processor management (e.g., scheduling), component management, networking, and security settings, among other functionalities. The services 826 can provide other common services for the other software layers. The drivers 828 are responsible for controlling or interfacing with the underlying hardware. For instance, the drivers 828 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 814 provide a common low-level infrastructure used by the applications 818. The libraries 814 can include system libraries 830 (e.g., C standard library) that provide functions such as memory allocation functions, string manipulation functions, mathematic functions, and the like. In addition, the libraries 814 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 814 can also include a wide variety of other libraries 834 to provide many other APIs to the applications 818.

The frameworks 816 provide a common high-level infrastructure that is used by the applications 818. For example, the frameworks 816 provide various graphical user interface (GUI) functions, high-level resource management, and high-level location services. The frameworks 816 can provide a broad spectrum of other APIs that can be used by the applications 818, some of which may be specific to a particular operating system or platform.

In an example, the applications 818 may include a home application 836, a contacts application 838, a browser application 840, a book reader application 842, a location application 844, a media application 846, a messaging application 848, a game application 850, and a broad assortment of other applications such as a third-party application 852. The applications 818 are programs that execute functions defined in the programs. Various programming languages can be employed to create one or more of the applications 818, structured in a variety of manners, such as object-oriented programming languages (e.g., Objective-C, Java, or C++) or procedural programming languages (e.g., C or assembly language). In a specific example, the third-party application 852 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 852 can invoke the API calls 820 provided by the operating system 812 to facilitate functionalities described herein.

EXAMPLES

Example 1. A computing device comprising:
at least one processor;
at least one memory component storing instructions that, when executed by the at least one processor, cause the at least one processor to perform operations comprising:
determining that an update to a model for an application running on the computing device is available on a backend system, the model configured to analyze content to generate a ranked list of content;
downloading the update from the backend system to a temporary storage location on the computing device;
validating the update to the model without loading it permanently into the application by performing operations comprising:
executing the update to the model with no data to generate an evaluation score; and
determining that validation passed or failed based on the evaluation score;
based on determining that validation passed, generating an updated model by updating the model with the update to the model;
determining that new features for the model are available on the backend system;
generating composite features comprising the new features and local features currently stored on the computing device;
storing the composite features to a data store corresponding to the application; generating, using the updated model and the composite features, a ranked list of content; and
causing display of the ranked list on a display of the computing device.

Example 2. A computing device according to any of the previous examples, wherein determining that an update to the model for the application running on the computing device on the backend system is based on determining a previously downloaded version of the model for the application running on the computing device.

Example 3. A computing device according to any of the previous examples, wherein the update to the model comprises a series of characters that is interpreted by the application to update the model and the update to the model is not executable by itself.

Example 4. A computing device according to any of the previous examples, wherein the series of characters is in a Protocol Buffers (Protobuf) format.

Example 5. A computing device according to any of the previous examples, wherein based on determining that validation failed, removing the update to the model from the computing device without generating an updated model.

Example 6. A computing device according to any of the previous examples, where in the local features comprise at least one of a friendship status, account name or streak information.

Example 7. A computing device according to any of the previous examples, wherein the new features comprise an input value associated with a subject to be evaluated during ranking.

Example 8. A computing device according to any of the previous examples, wherein the input value comprises a frequency of sending or a frequency of viewing.

Example 9. A computing device according to any of the previous examples, where the model is an AST model, a machine learning based model, or a composer or JavaScript based model.

Example 10. A computing device according to any of the previous examples, the operations further comprising:
 capturing an image or video via a camera of the computing device;
 detecting selection of an option to share the captured image or video;
 wherein generating, using the updated model and the composite features, the ranked list of content comprises:
  evaluating each contact in a list of contacts accessible by the application;
  generating a score for each contact in the list of contacts accessible by the application; and
  generating the ranked list of content based on the score for each contact; and
 wherein causing display of the ranked list comprises causing display of a subset of the ranked list of content with a predefined number of top ranked contacts for selection to share the image or video.

Example 11. A computing device according to any of the previous examples, wherein generating, using the updated model and the composite features, the ranked list of content comprises:
 evaluating each media collection in a plurality of media collections available to be viewed in the application, each media collection comprising a plurality of images or videos;
 generating a score for each media collection in the plurality of media collections;
 generating the ranked list based on the score for each media collection; and
 wherein causing display of the ranked list comprises causing display of the ranked list of media collections to view in the application.

Example 12. A computing device according to any of the previous examples, further comprising:
 generating metrics associated with use of the updated model, the metrics comprising at least one of a session time, a send count, a crash rate, CPU metrics, and battery metrics.

Example 13. A computer-implemented method according to any of the previous examples, comprising:
 determining that an update to a model for an application running on a computing device is available on a backend system, the model configured to analyze content to generate a ranked list of content;
 downloading the update from the backend system to a temporary storage location on the computing device;
 validating the update to the model without loading it permanently into the application by performing operations comprising:
  executing the update to the model with no data to generate an evaluation score; and
  determining that validation passed or failed based on the evaluation score;
 based on determining that validation passed, generating an updated model by updating the model with the update to the model;
 determining that new features for the model are available on the backend system;
 generating composite features comprising the new features and local features currently stored on the computing device;
 storing the composite features to a data store corresponding to the application; generating, using the updated model and the composite features, a ranked list of content; and
 causing display of the ranked list on a display of the computing device.

Example 14. A computer-implemented method according to any of the previous examples, wherein determining that an update to the model for the application running on the computing device on the backend system is based on determining a previously downloaded version of the model for the application running on the computing device.

Example 15. A computer-implemented method according to any of the previous examples, wherein the update to the model comprises a series of characters that is interpreted by the application to update the model and the update to the model is not executable by itself.

Example 16. A computer-implemented method according to any of the previous examples, wherein the series of characters is in a Protocol Buffers (Protobuf) format.

Example 17. A computer-implemented method according to any of the previous examples, wherein based on determining that validation failed, removing the update to the model from the computing device without generating an updated model.

Example 18. A computer-implemented method according to any of the previous examples, where in the local features comprise at least one of a friendship status, account name or streak information.

Example 19. A computer-implemented method according to any of the previous examples, wherein the new features comprise an input value associated with a subject to be evaluated during ranking.

Example 20. A non-transitory computer-readable storage medium according to any of the previous examples, storing instructions that, when executed by at least one processor, cause the at least one processor to perform operations comprising:
 determining that an update to a model for an application running on a computing device is available on a backend system, the model configured to analyze content to generate a ranked list of content;

downloading the update from the backend system to a temporary storage location on the computing device;

validating the update to the model without loading it permanently into the application by performing operations comprising:

executing the update to the model with no data to generate an evaluation score; and determining that validation passed or failed based on the evaluation score;

based on determining that validation passed, generating an updated model by updating the model with the update to the model;

determining that new features for the model are available on the backend system;

generating composite features comprising the new features and local features currently stored on the computing device;

storing the composite features to a data store corresponding to the application;

generating, using the updated model and the composite features, a ranked list of content; and causing display of the ranked list on a display of the computing device.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A computing device comprising:
at least one processor;
at least one memory component storing instructions that, when executed by the at least one processor, cause the at least one processor to perform operations comprising:
detecting, when an application is running on the computing device, that an update to a model for the application is available on a backend system, the model configured to analyze content to generate a ranked list of content;
downloading the update from the backend system to a temporary storage location on the computing device;
validating the update to the model without loading it permanently into the application by performing operations comprising:
executing the update to the model with no data to generate an evaluation score; and
analyzing the evaluation score to determine whether validation passed or failed;
based on determining that validation passed, updating the model with the update to the model;

detecting that new features for the model are available on the backend system;
generating composite features comprising the new features and local features currently stored on the computing device;
storing the composite features to a data store corresponding to the application;
executing the updated model to output a ranked list of content, using the composite features; and
causing display of the ranked list on a display of the computing device.

2. The computing device of claim 1, wherein detecting that an update to the model for the application is available on the backend system is based on determining a previously downloaded version of the model for the application running on the computing device.

3. The computing device of claim 1, wherein the update to the model comprises a series of characters that is interpreted by the application to update the model and the update to the model is not executable by itself.

4. The computing device of claim 3, wherein the series of characters is in a Protocol Buffers (Protobuf) format.

5. The computing device of claim 1, wherein based on determining that validation failed, removing the update to the model from the computing device without generating an updated model.

6. The computing device of claim 1, where in the local features comprise at least one of a friendship status, account name or streak information.

7. The computing device of claim 1, wherein the new features comprise an input value associated with a subject to be evaluated during ranking.

8. The computing device of claim 7, wherein the input value comprises a frequency of sending or a frequency of viewing.

9. The computing device of claim 1, where the model is an AST model, a machine learning based model, or a composer or JavaScript based model.

10. The computing device of claim 1, the operations further comprising:
capturing an image or video via a camera of the computing device;
detecting selection of an option to share the captured image or video;
wherein executing the updated model to output the ranked list of content, using the composite features comprises:
evaluating each contact in a list of contacts accessible by the application;
calculating a score for each contact in the list of contacts accessible by the application; and
generating the ranked list of content based on the score for each contact; and
wherein causing display of the ranked list comprises causing display of a subset of the ranked list of content with a predefined number of top ranked contacts for selection to share the image or video.

11. The computing device of claim 1, wherein executing the updated model to output the ranked list of content, using the composite features comprises:
evaluating each media collection in a plurality of media collections available to be viewed in the application, each media collection comprising a plurality of images or videos;
calculating a score for each media collection in the plurality of media collections;
generating the ranked list based on the score for each media collection; and
wherein causing display of the ranked list comprises causing display of the ranked list of media collections to view in the application.

12. The computing device of claim 1, further comprising:
generating metrics associated with use of the updated model, the metrics comprising at least one of a session time, a send count, a crash rate, CPU metrics, and battery metrics.

13. A computer-implemented method comprising:
detecting, when an application is running on a computing device, that an update to a model for the application is available on a backend system, the model configured to analyze content to generate a ranked list of content;
downloading the update from the backend system to a temporary storage location on the computing device;
validating the update to the model without loading it permanently into the application by performing operations comprising:
executing the update to the model with no data to generate an evaluation score; and
analyzing the evaluation score to determine whether validation passed or failed;
based on determining that validation passed, updating the model with the update to the model;
detecting that new features for the model are available on the backend system;
generating composite features comprising the new features and local features currently stored on the computing device;
storing the composite features to a data store corresponding to the application;
executing the updated model to output a ranked list of content, using the composite features; and
causing display of the ranked list on a display of the computing device.

14. The computer-implemented method of claim 13, wherein detecting that an update to the model for the application is available on the backend system is based on determining a previously downloaded version of the model for the application running on the computing device.

15. The computer-implemented method of claim 13, wherein the update to the model comprises a series of characters that is interpreted by the application to update the model and the update to the model is not executable by itself.

16. The computer-implemented method of claim 15, wherein the series of characters is in a Protocol Buffers (Protobuf) format.

17. The computer-implemented method of claim 13, wherein based on determining that validation failed, removing the update to the model from the computing device without generating an updated model.

18. The computer-implemented method of claim 13, where in the local features comprise at least one of a friendship status, account name or streak information.

19. The computer-implemented method of claim 13, wherein the new features comprise an input value associated with a subject to be evaluated during ranking.

20. A non-transitory computer-readable storage medium storing instructions that, when executed by at least one processor, cause the at least one processor to perform operations comprising:
detecting, when an application is running on a computing device, that an update to a model for the application is available on a backend system, the model configured to analyze content to generate a ranked list of content;
downloading the update from the backend system to a temporary storage location on the computing device;

validating the update to the model without loading it permanently into the application by performing operations comprising:
   executing the update to the model with no data to generate an evaluation score; and
   analyzing the evaluation score to determine whether validation passed or failed;

based on determining that validation passed, updating the model with the update to the model;

detecting that new features for the model are available on the backend system;

generating composite features comprising the new features and local features currently stored on the computing device;

storing the composite features to a data store corresponding to the application;

executing the updated model to output a ranked list of content, using the composite features; and causing display of the ranked list on a display of the computing device.

* * * * *